United States Patent
Fowler et al.

(10) Patent No.: US 9,506,509 B1
(45) Date of Patent: Nov. 29, 2016

(54) CLUTCH CONTROL USING DITHER

(71) Applicant: Ford Global Technologies, LLC, Dearborn, MI (US)

(72) Inventors: John G. Fowler, Livonia, MI (US); Joseph F. Kucharski, Livonia, MI (US); Michael William Brylinski, Wixom, MI (US); Timothy L. Sargent, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/849,636

(22) Filed: Sep. 10, 2015

(51) Int. Cl.
*F16H 3/08* (2006.01)
*F16D 48/06* (2006.01)

(52) U.S. Cl.
CPC .......... *F16D 48/06* (2013.01); *F16D 2300/22* (2013.01); *F16D 2500/10412* (2013.01); *F16D 2500/50293* (2013.01)

(58) Field of Classification Search
None
See application file for complete search history.

(56) References Cited

U.S. PATENT DOCUMENTS

| | | | |
|---|---|---|---|
| 5,904,068 A * | 5/1999 | Genise | B60W 10/06 477/111 |
| 6,658,341 B2 * | 12/2003 | Inoue | F16D 48/06 192/48.609 |
| 7,299,120 B2 | 11/2007 | Serebrennikov | |
| 7,445,107 B2 * | 11/2008 | Kawamoto | F16H 61/061 192/109 F |
| 8,666,580 B2 | 3/2014 | Hashimoto | |
| 8,666,624 B2 * | 3/2014 | Kawamoto | F16D 48/066 477/166 |
| 8,718,854 B2 | 5/2014 | Hashimoto | |
| 2010/0286832 A1 * | 11/2010 | Zipperer | F15B 13/0402 700/280 |
| 2015/0123624 A1 | 5/2015 | Ookawa et al. | |

* cited by examiner

*Primary Examiner* — Dirk Wright
(74) *Attorney, Agent, or Firm* — James Dottavio; Brooks Kushman P.C.

(57) ABSTRACT

During state transitions, a clutch actuator position command includes an oscillating component called a dither. This dithering helps avoid jumps in the actuator position due to friction when the commanded position is changed gradually. Also, dither during a transition from fully released to slipping causes the natural frequency of the system to change gradually rather than abruptly. This permits use of another slipping clutch for active damping based on a measured oscillation.

15 Claims, 4 Drawing Sheets

CLUTCH CONTROL USING DITHER

TECHNICAL FIELD

The present disclosure relates to transmission control. More particularly, disclosure relates to use of dithering to reduce the occurrence of powertrain vibrations during clutch state transitions.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output driving the vehicle wheels, often via a differential assembly which permits the left and right wheel to rotate at slightly different speeds as the vehicle turns.

FIG. 1 schematically illustrates a Dual Clutch Transmission (DCT). Input 20 is adapted for coupling to an engine crankshaft, potentially via a damper assembly that reduces the transmission of engine pulsations. Ring gear 22 is fixedly coupled to a differential to distribute power between two drive wheels. First output pinion 24 is fixedly coupled to first layshaft 26 and meshes with ring gear 22. Second output pinion 28 is fixedly coupled to second layshaft 30 and also meshes with ring gear 22. First friction clutch 32 selectively couples input 20 to solid shaft 34, while second friction clutch 36 selectively couples input 20 to hollow shaft 38 which is concentric with solid shaft 34.

Gears 40 and 42 are supported for rotation about first layshaft 26 and mesh with gears 44 and 46 respectively which are fixedly coupled to solid shaft 34. Coupler 48 selectively couples gear 40 or 42 to first layshaft 26. Gear 50 is supported for rotation about second layshaft 30 and meshes with gear 52 which is fixedly coupled to solid shaft 34. Coupler 58 selectively couples gear 50 to second layshaft 30. When couplers 48 or 58 have coupled one of gears 40, 42, or 50 to the respective layshaft, a power flow path is established between solid shaft 34 and ring gear 22. Each of these different power flow paths is associated with a different speed ratio. When clutch 32 is also engaged, a power flow path is established between input 20 and ring gear 22.

Gears 60 and 62 are supported for rotation about second layshaft 30 and mesh with gears 64 and 66 respectively which are fixedly coupled to hollow shaft 38. Coupler 68 selectively couples gear 60 or 62 to second layshaft 30. Gears 70 and 72 are supported for rotation about first layshaft 26 and mesh with gear 66 and 60 respectively. Coupler 74 selectively couples gear 70 or 72 to first layshaft 26. When couplers 68 or 74 have coupled one of gears 60, 62, 70, or 72 to the respective layshaft, a power flow path is established between hollow shaft 38 and ring gear 22. When clutch 36 is also engaged, a power flow path is established between input 20 and ring gear 22. The speed ratios associated with clutch 36 are interleaved with the speed ratios associated with clutch 32 such that clutch 32 is used to establish odd numbered gear ratios and clutch 36 is used to establish even numbered gear ratios and reverse.

When a driver selects Drive with the vehicle stationary, coupler 48 is commanded to couple gear 42 to shaft 26 while clutch 36 is commanded to disengage. To launch the vehicle, clutch 32 is commanded to gradually engage. Similarly, when Reverse is selected with the vehicle stationary, coupler 74 is commanded couple gear 72 to shaft 26. Then, clutch 36 is commanded to gradually engage to launch the vehicle. When cruising in an odd numbered gear, clutch 32 is engaged. To shift to an even numbered gear, clutch 36 is disengaged (if it was not already disengaged), and either coupler 68 or 74 pre-selects the destination power flow path. After the destination gear is pre-selected, clutch 32 is released and clutch 36 is engaged in a coordinated fashion to transfer power between the corresponding power flow paths and adjust the overall speed ratio.

Clutches 32 and 36 may be either dry or wet friction type clutches. One or more friction plates are fixedly coupled one of the elements while a housing with a pressure plate and a reaction plate is fixedly coupled to the other element. The friction plates are between the pressure plate and the reaction plate. If there is more than one friction plate, they are separated by separator plates that are also fixedly coupled to the housing. When the clutch is fully disengaged, the reaction plate and the pressure plate are spaced apart such that the friction plate can rotate relative to the housing with minimal drag torque. To engage the clutch, an actuator causes a normal force that squeezes the friction plate(s) between the pressure plate and the reaction plate. The torque capacity of the clutch is proportional to the normal force and also proportional to the coefficient of friction. The coefficient of friction may depend upon the relative speeds and on other factors such as the clutch temperature. Ideally, the coefficient of friction varies continuously with changes in relative speed, but some clutch materials depart from this ideal behavior and exhibit a sharp reduction in coefficient of friction between no slip and some slip. If the elements are rotating at different speeds, the clutch exerts torque on each element equal to the torque capacity in a direction tending to equalize the speeds. If the elements are at the same speed, then the clutch transfers as much torque as is applied up to the torque capacity. If the applied torque exceeds the torque capacity, then the clutch slips creating relative speed.

Some clutches use position controlled actuation in which a controller commands the actuator to move to a specified position. The actuator may be linked to the pressure plate and reaction plate through springs such that the clutch normal force may be adjusted by adjusting the actuator position as illustrated in FIG. 2. As the actuator moves through the disengaged region at 80, the normal force is zero. After the actuator position passes a touchpoint 82, the normal force increases in proportion to changes in the actuator position. When the controller commands a change in direction of actuator position, the normal force may remain constant for some distance before changing direction as shown at 84, due to hysteresis. Some clutches may respond to other ways of adjusting the normal force, such as adjusting a hydraulic pressure instead of adjusting an actuator position. These other mechanisms may also be characterized by a touchpoint and hysteresis.

SUMMARY

A transmission includes an input, an output, first and second intermediate shafts, first and second clutches, first and second couplers, and a controller. The first and second clutches are configured to selectively couple the input to the first and second intermediate shafts, respectively. The first and second couplers are configured to selectively establish power flow paths between the first and second intermediate shafts respectively and the output. The transmission has a first natural frequency when the first coupler is engaged and the second coupler is disengaged. The controller is programmed to command an oscillating actuator position of the second clutch with a dithering frequency at least 2.5 times the natural frequency to dampen resonance. A dithering amplitude may exceed a hysteresis. For example, the commanded actuator position may follow a square waveform, a saw-tooth waveform, or other waveform. The actuator position of the second clutch may oscillate about a nominal commanded actuator position which gradually decreases as the second clutch transitions from a fully engaged state to a slipping state. The actuator position may oscillate about a nominal commanded actuator position which gradually increases as the second clutch transitions from a fully released state to a slipping state during a transition interval. During the transition interval, the clutch may have positive torque capacity during a portion of each cycle and be fully released during a remainder of each cycle. During this interval, the controller may control the first clutch to actively dampen a measured speed oscillation.

A method of controlling a transmission clutch includes issuing an actuator command according to a sum of a nominal component and an oscillating component and increasing the nominal component from a first value to a second value. The first value is less than a touchpoint by more than the amplitude of the oscillating component while the second value is greater than the touchpoint by more than the oscillating component. The actuator command may be a position. The transmission may be a dual clutch transmission, in which case the clutch may be released in response to the speed of a shaft reaching a target value. A second clutch may be controlled in a slipping condition to dampen a measured speed oscillation.

A method of controlling a transmission clutch includes issuing an actuator command according to a sum of a nominal component and an oscillating component with an amplitude and, while the amplitude exceeds a hysteresis, adjusting the nominal component to transition between clutch states. For example, the clutch may transition from a fully released state to a slipping state or may transition from a fully engaged state to a slipping state.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
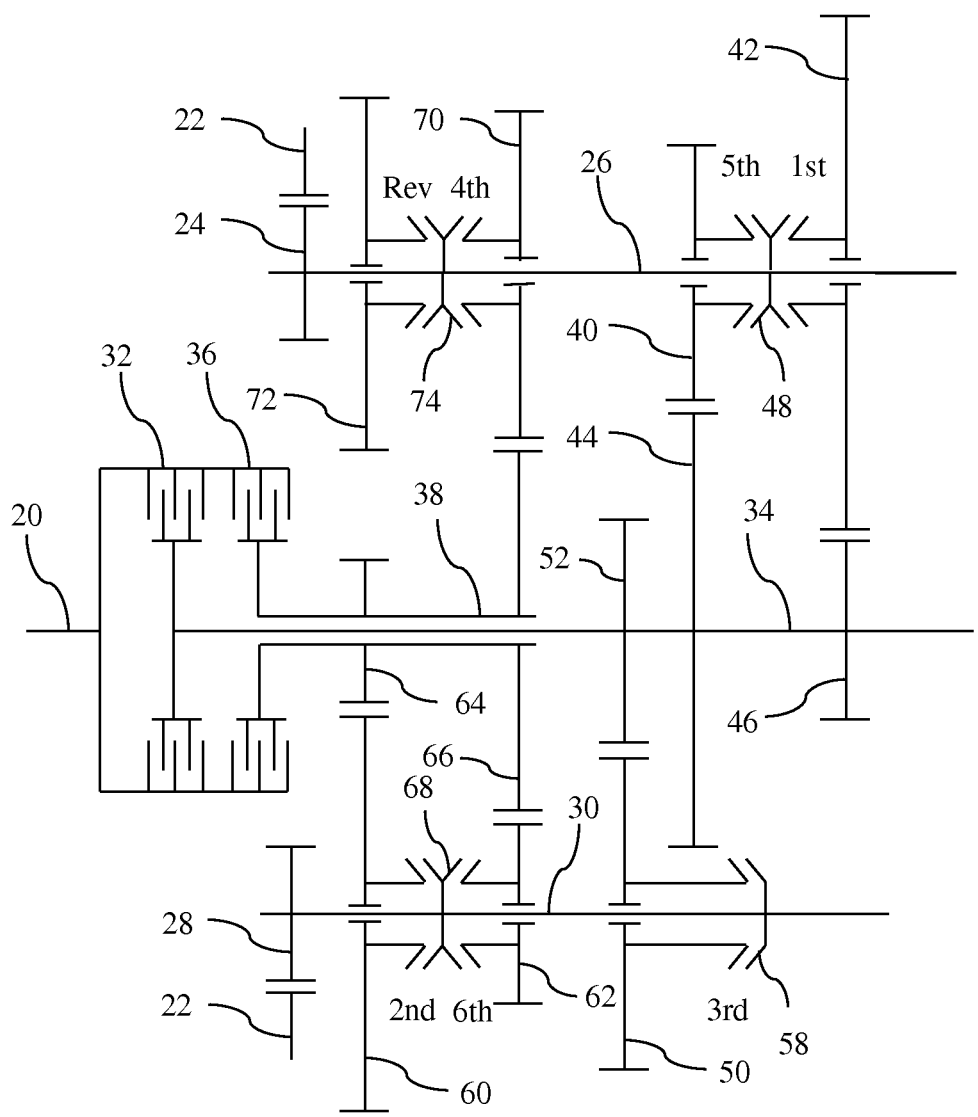
FIG. 1 is a schematic representation of an exemplary dual clutch transmission.
Figure 2:
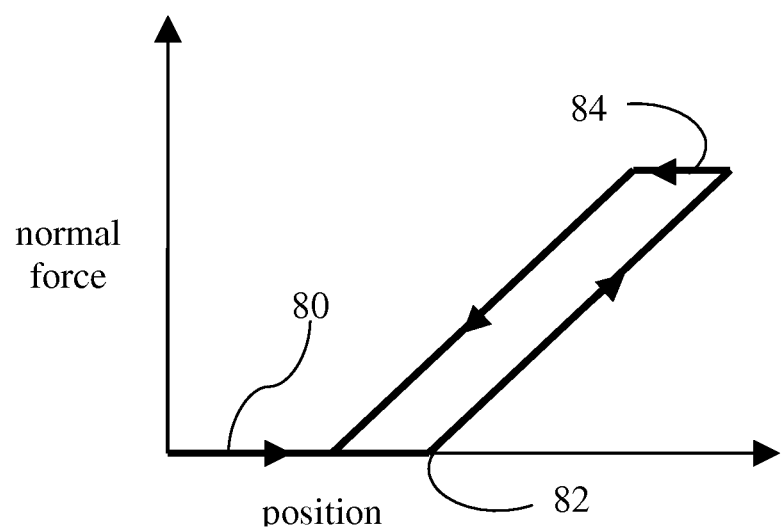
FIG. 2 is a graph illustrating a relationship between actuator position and clutch normal force including the effect of hysteresis.

Referring to the transmission schematic of FIG. 1, the transmission is prepared for launch in a forward direction by sliding coupler 48 to couple gear 42 to shaft 26, thus pre-selecting 1st gear. Then, to start the vehicle moving, the torque capacity of clutch 32 is gradually increased. Couplers 58, 68, and 74 and clutch 36 may be disengaged during this process. Shaft 38 and gears 60, 62, 64, 66, 70, and 72 all tend to remain stationary during this process because they have inertia and no torque acts upon them. In order to prepare for a shift into 2nd gear, gear 60 must be coupled to shaft 30 by sliding coupler 68. Coupler 68 may have limited capability to quickly and smoothly synchronize the speeds of gear 60 and shaft 30 before engagement. Therefore, clutch 36 may be used to bring the speed of gear 60 close to the speed of shaft 30 before using coupler 68 to complete the synchronization and coupling. Using of one of the friction clutches 32 and 36 in this way is called a Clutch Before Synchronization (CBS) event. CBS events may be performed in many different gear ratios as part of the process of pre-selecting a new gear ratio.

During a CBS event, the torque capacity of the clutch must be accurately controlled at a level far below the clutch's maximum design torque capacity. In order to accomplish this, the actuator must be positioned very close to the touchpoint. Small errors in actuator position may result in either zero torque capacity or a torque capacity several times as large as desired. If the torque capacity is zero, synchronization does not happen. If the torque capacity is substantially more than desired, then the speed of the shaft rapidly increases past the target speed until the clutch becomes fully engaged. The clutch torque changes almost instantaneously as the clutch becomes fully engaged, which results in almost instantaneous changes in torque in many other components. These very rapid changes in torque can set off vibrations at a natural frequency of the transmission and driveline which vehicle occupants find unpleasant.

Figure 3:
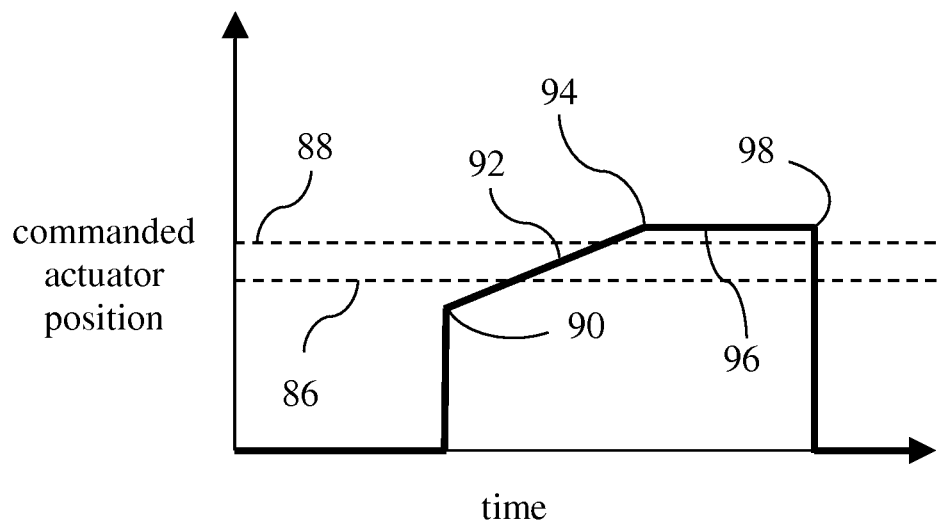
FIG. 3 is a graph illustrating a commanded actuator position during a Clutch Before Synch (CBS) event according to a first control method.

FIG. 3 illustrates one potential way to command a clutch actuator during a CBS event. Dotted line 86 represents the controller's best estimate of the actuator position corresponding to the touchpoint. Dotted line 88 represents the controller's best estimate of the actuator position corresponding to the desired torque capacity during the CBS event. At 90, the controller commands the actuator position to a value slightly less than the estimated touchpoint. Then, the controller gradually increases the actuator position at a predetermined ramp rate at 92, while monitoring one or more speed sensors to determine the progress of the event. When the controller determines at 94 that the clutch capacity is near the desired value, the controller commands a constant actuator position at 96. At 98, the controller determines that the CBS event is complete and commands the actuator to the disengaged position. In practice, this method has not proven sufficiently robust. Due to friction in the actuator mechanism, the actuator does not necessarily respond linearly to small changes in commanded position. Instead, it may stick and then jump by more than desired. Sometimes, the clutch torque capacity may suddenly change from less than the desired level to substantially more than the desired level. When this happens, the clutch may become fully engaged and set off a transmission and driveline vibration.

Figure 4:
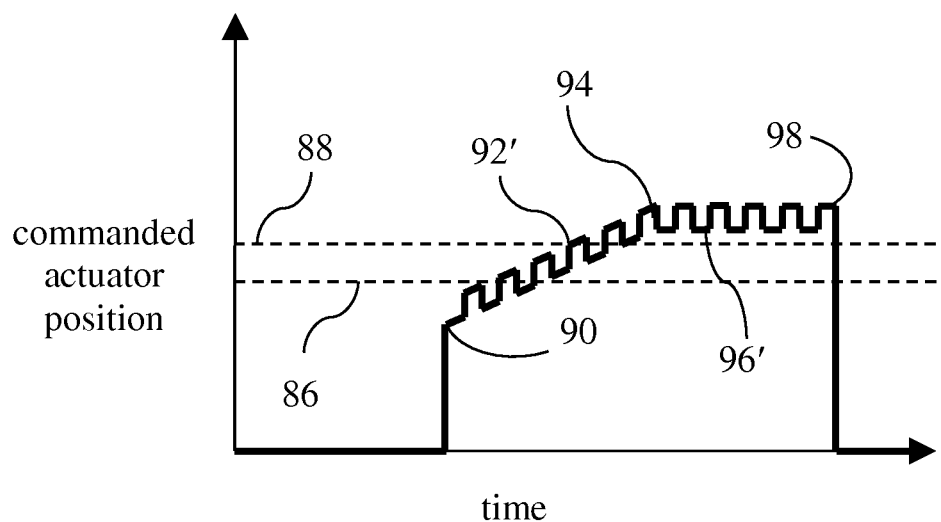
FIG. 4 is a graph illustrating a commanded actuator position during a Clutch Before Synch (CBS) event according to a second control method that utilizes dither.

FIG. 4 illustrates an improved method of commanding a clutch actuator during a CBS event. Between 90 and 98, the actuator command is a sum of a nominal component as indicated by FIG. 3 and an oscillating component, as shown at 92' and 96'. The oscillating component is called a dither. Preferably the dithering amplitude is greater than the hysteresis. The dither reduces the tendency of the actuator to stick in a position and then jump by more than desired. At the same time, dither removes the sharp change in slope of normal force as a function of actuator position near the touchpoint and replaces it with a more gradual change in slope. The result is that actuator hysteresis and touchpoint estimation errors are both mitigated by dither. The frequency of the dither is preferably at least 2.5 times the natural frequency to avoid exciting a vibration. Although a square waveform is illustrated in FIG. 4, other waveforms may also be employed such as a saw-tooth waveform or a sinusoidal waveform. The inventors have determined experimentally that the method of FIG. 4 is substantially less likely to produce annoying vibrations than the method of FIG. 3.

In some cases, one of the friction clutches 32 or 36 will be in a slipping state while the other clutch performs a CBS event. For example, the clutch 36 CBS event to engage 2nd gear may occur during vehicle launch prior to clutch 32 being fully engaged. When a clutch is in a slipping condition, it is sometimes feasible to actively control the slipping clutch to reduce the magnitude of a vibration at a powertrain natural frequency. The controller determines the frequency and phase of the vibration using speed sensors or other sensors. Using this information, the controller varies the torque exerted by the slipping clutch at the same frequency as the vibration with a phase angle calculated to reduce the vibration.

The natural frequency of a transmission and driveline system changes depending upon the state of engagement of clutches and couplers. The system may have one natural frequency when a particular clutch is fully released, a second natural frequency when the clutch is slipping, and a third natural frequency when the clutch is fully engaged. During a CBS event, the system natural frequency will transition from the first value to the second value. If the CBS event results in an unintentional full engagement of a clutch, the natural frequency may even be equal to the third value for a portion of the time. When a CBS event is controlled according to the method of FIG. 3, the change in natural frequency occurs abruptly at the time that the actuator position crosses the touchpoint 86. Therefore, active damping control using the other clutch is ineffective during the CBS event and may even re-inforce the vibration. Therefore, active damping control using the slipping clutch may be suspended during a CBS event.

When a CBS event is controlled according to the method of FIG. 4, the natural frequency changes gradually. During a portion of phase 92', the actuator position rapidly alternates between positions on opposite sides of the touchpoint. The clutch spends a portion of the time in the fully open condition and a portion of the time in the slipping condition. Since the dithering frequency is substantially higher than either relevant natural frequency, the effective natural frequency during this period of time is a weighted average of the two natural frequencies with weighting factors based on the proportion of time spend in each clutch state. As the average position about which the dithering is performed gradually increases, the proportion of time spent in a slipping state gradually increases. Thus, the effective natural frequency gradually changes from the frequency associated with a released clutch to the frequency associated with a slipping clutch. By continuously monitoring the frequency of any vibration during this time period, the controller may be able to effectively dampen such vibrations using active control of the slipping clutch.

Figure 5:
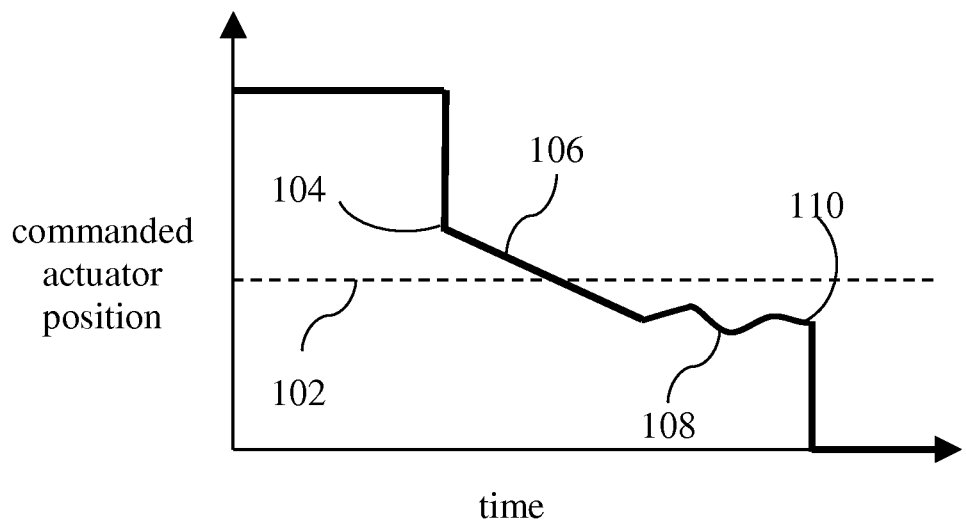
FIG. 5 is a graph illustrating a commanded actuator position during a clutch release event according to a first control method.

Clutch release events, like CBS events, can set off powertrain vibrations. FIG. 5 illustrates one potential way to command a clutch actuator during a clutch release event. Dotted line 102 represents the controller's best estimate of the actuator position at which the torque capacity is equal to the current clutch torque based on the static coefficient of friction. At 104, the controller commands the actuator position to a value slightly higher than 102. Then, the controller gradually decreases the actuator position at a predetermined ramp rate at 106, while monitoring one or more speed sensors to determine when clutch slip actually begins. When the clutch begins to slip, the torque capacity may drop due to a change in friction coefficient. While the clutch is slipping, the transmitted torque is equal to the torque capacity. Due to friction in the actuator mechanism, the actuator does not necessarily respond linearly to the small changes in commanded position at 106. Instead, it may stick and then jump by more than desired. If this sudden change in actuator position occurs as the clutch begins slipping, it increases the magnitude of the torque change and increases the likelihood of setting of a vibration and/or increases the likely magnitude of such a vibration. At 108, the controller continuously adjusts the commanded actuator position in order to maintain a desired level of clutch slip using feedback control based on speed measurements. Due to friction and hysteresis in the actuator mechanism, the actual torque capacity does not always respond in direct proportion to these small changes in commanded actuator position. This limits the ability of the controller to maintain the desired slip within a narrow band. If the desired slip is small, the clutch may become unintentionally fully engaged. If that happens, the change in friction coefficient will likely result in further torque fluctuations and increased likelihood of setting off vibrations. When torque is no longer desired, the actuator is commanded to a fully released position at 110.

Figure 6:
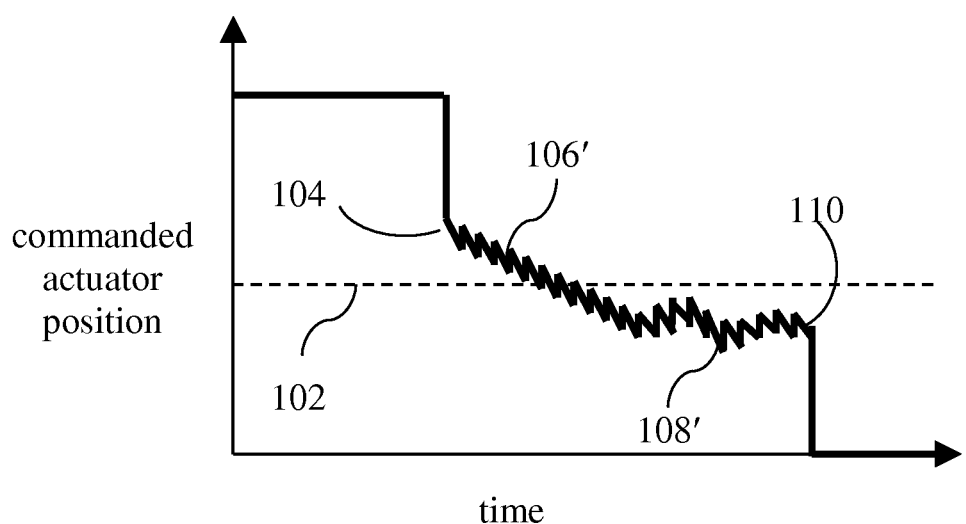
FIG. 6 is a graph illustrating a commanded actuator position during a clutch release event according to a second control method that utilizes dither.

FIG. 6 illustrates an improved method of commanding a clutch actuator during a clutch release event. At 106' and 108', the actuator command is a sum of a nominal component as indicated by FIG. 5 and an oscillating component called dither. Preferably the dithering amplitude is greater than the hysteresis. The dither reduces the tendency of the actuator to stick in a position and then jump by more than desired. The frequency of the dither is preferably at least 2.5 times the natural frequency to avoid exciting a vibration. Although a saw-tooth waveform is illustrated in FIG. 6, other waveforms may also be employed. Although FIGS. 5 and 6 illustrate releasing a clutch from an intentional fully locked state, dither is also useful when maintaining a small degree of slip for an extended period. While attempting to maintain a low degree of slip using closed loop control, the clutch may accidentally become fully engaged. Dither makes accidental full engagement less likely and helps to better control the subsequent release back into the slipping state. Similarly, dither is useful while controlling the rate at which slip decreases to zero during an intentional full engagement and for controlling the transition from slipping to a fully released state.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
   an input;
   an output;
   a first intermediate shaft;
   a second intermediate shaft;
   a first clutch configured to selectively couple the input to the first intermediate shaft;
   a second clutch configured to selectively couple the input to the second intermediate shaft;
   a first coupler configured to selectively establish a power flow path between the first intermediate shaft and the output;
   a second coupler configured to selectively establish a power flow path between the second intermediate shaft and the output, wherein the transmission has a first natural frequency when the first coupler is engaged and the second coupler is disengaged; and
   a controller programmed to command an oscillating actuator position of the second clutch with a dithering frequency to dampen resonance at the first natural frequency, wherein a ratio of the dithering frequency to the natural frequency is at least 2.5.

2. The transmission of claim 1 wherein the commanded actuator position of the second clutch oscillates about a nominal commanded actuator position and wherein the nominal commanded actuator position gradually decreases as the second clutch transitions from a fully engaged state to a slipping state.

3. The transmission of claim 1 wherein the commanded actuator position of the second clutch oscillates about a nominal commanded actuator position and wherein the nominal commanded actuator position gradually increases as the second clutch transitions from a fully released state to a slipping state such that, during a transition interval, the clutch has positive torque capacity during a portion of each cycle and is fully released during a remainder of each cycle.

4. The transmission of claim 3 wherein the controller is further programmed to respond, during the transition interval, to a measurement of an oscillating speed by varying a commanded actuator position of the first clutch at a frequency of the oscillating speed with a phase difference to dampen the oscillation of the speed.

5. The transmission of claim 1, wherein the second clutch actuator position command oscillates according to a square waveform.

6. The transmission of claim 1, wherein the second clutch actuator position command oscillates according to a saw-tooth waveform.

7. The transmission of claim 1, wherein an actuator mechanism for the second clutch has a hysteresis, and the controller is further programmed to command the oscillating actuator position of the second clutch with a dithering amplitude that exceeds the hysteresis.

8. A method of controlling a transmission clutch comprising:
   issuing an actuator command according to a sum of a nominal component and an oscillating component, the oscillating component having an amplitude; and
   increasing the nominal component from a first value to a second value, wherein the first value is less than a touchpoint by more than the amplitude and the second value exceeds the touchpoint by more than the amplitude.

9. The method of claim 8 wherein the command is a position.

10. The method of claim 8 wherein the transmission is a dual clutch transmission.

11. The method of claim 10 further comprising:
    measuring a speed of a shaft; and
    reducing the command to less than the touchpoint in response to the speed of the shaft reaching a target value.

12. The method of claim 10 further comprising:
    measuring an oscillating speed; and
    varying a command to a second clutch at a frequency of the oscillating speed with a phase difference to dampen the oscillation of the speed.

13. A method of controlling a transmission clutch comprising:
    issuing an actuator command according to a sum of a nominal component and an oscillating component, the oscillating component having an amplitude; and
    while the amplitude exceeds a hysteresis, adjusting the nominal component to transition from one of a fully released state, a slipping state, or a fully engaged state to another of the fully released state, the slipping state, or the fully engaged state.

14. The method of claim 13 wherein the transition is from the fully released state to the slipping state.

15. The method of claim 13 wherein the transition is from the fully engaged state to the slipping state.

* * * * *